Jan. 22, 1963 R. E. MEEKER ETAL 3,074,782
HYDROGEN PEROXIDE PURIFICATION
Filed May 29, 1959
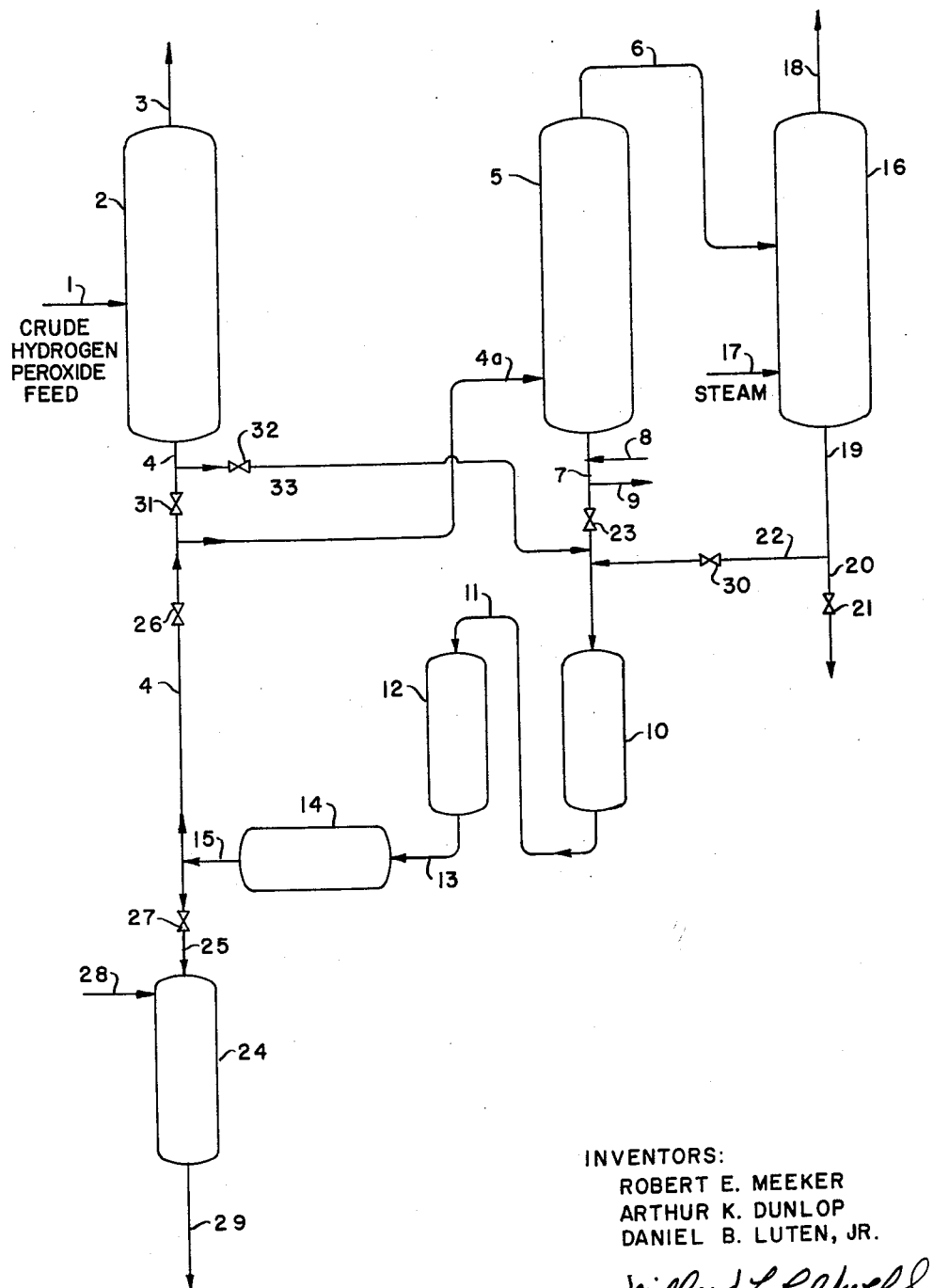
INVENTORS:
ROBERT E. MEEKER
ARTHUR K. DUNLOP
DANIEL B. LUTEN, JR.
BY: Millard L. Caldwell
THEIR ATTORNEY 3,074,782
Patented Jan. 22, 1963

3,074,782
HYDROGEN PEROXIDE PURIFICATION
Robert E. Meeker, Arthur K. Dunlop, and Daniel B. Luten, Jr., Berkeley, Calif., assignors to Shell Oil Company, a corporation of Delaware
Filed May 29, 1959, Ser. No. 816,841
7 Claims. (Cl. 23—207)

This invention relates to the removal of organic impurities from hydrogen peroxide and deals with an improved method of hydrogen peroxide purification whereby such impurities can be removed efficiently and economically with minimum loss of peroxide in the process.

The development of commercial scale methods for producing hydrogen peroxide by partial oxidation of certain special organic compounds has given increased importance to the need for an effective method for purifying hydrogen peroxide containing organic impurities introduced in the manufacturing process. Among methods of oxidation, which result in hydrogen peroxide requiring removal of organic impurities in order to meet the high purity requirements of many hydrogen peroxide uses, are the oxidation of anthroquinhydrones such as 2-ethyl anthroquinhydrone or azo-substituted aromatic hydrocarbons such as hydrazobenzene as described in Riedl et al. patent, U.S. 2,158,525, oxidation of normally gaseous hydrocarbons as shown in Lacomble patent, U.S. 2,376,257, and oxidation of alcohols, particularly secondary alcohols as taught in Rust patent, U.S. 2,871,104, for instance. Hydrogen peroxide from other sources, for example, electrolysis of bisulfate solutions, may also require purification to remove organic impurities acquired in the course of its use, for instance, in purification of excess hydrogen peroxide recovered after epoxidation or hydroxylation of unsaturated organic compounds.

A number of different methods have been proposed for removing organic impurities from hydrogen peroxide. Organic impurities more volatile than hydrogen peroxide can be removed satisfactorily, as a general rule, by distillation. Carboxylic acids can be removed by means of anion exchange resins in bicarbonate form as described in copending application of Dunlop, Meeker and Pierotti, Serial No. 714,510, filed February 11, 1958. Another advantageous method of removing carboxylic acids from peroxides makes use of anion exchange resins in the form of their monohydrogen phosphate and like special salts which effect the required removal of acid from the peroxide without exchange of anions so there is no contamination of the hydrogen peroxide in the process. This method of acid removal is fully described and claimed in copending application of Luten and Meeker, Serial No. 806,455 filed April 15, 1959.

Greater difficulty is encountered in the removal of other organic impurities especially relatively non-volatile organic impurities. Keeler et al. have described in U.S. Patent 2,819,949 a solution for this problem based on controlled heat treatment to convert organic impurities present in hydrogen peroxide to more volatile organic compounds which can be removed from the peroxide by distillation, preferably simultaneously with the heat treatment, after which steam stripping is carried out. The patent also suggests further purification of the stripper bottoms by treatment with a cation exchange resin to remove metal ions, evaporation of hydrogen peroxide from non-volatile impurities and another heat treatment of the residue which is then recycled to the steam stripping. While a substantial reduction in the organic impurity content of hydrogen peroxide can be obtained in this way, the losses of peroxide are undesirably high when high degrees of purification are carried out.

An important object of the present invention is the provision of a method for removing organic impurities from hydrogen peroxide by heat treatment with minimized loss of peroxide in the process. A special object is the provision of a combination of coordinated treatment steps whereby high purity hydrogen peroxide can be produced from crude peroxide containing organic impurities without excessive decomposition of the hydrogen peroxide. Other objects and advantages of the new process will be apparent from the following description of the invention.

It has been discovered that there is a synergistic or joint catalytic effect between carboxylic acids and heavy metal ions in promoting decomposition of hydrogen peroxide. In the production of hydrogen peroxide from organic sources, crude peroxide containing both of these types of impurities is always encountered at some stage of manufacture. The carboxylic acids, if not originally present in the peroxide, are formed therein when the peroxide is exposed to elevated temperatures as in evaporation or the like. Due to the corrosive action of hydrogen peroxide on the metal containers in which it is stored on a commercial scale, heavy metal ions are present even when the greatest efforts are made to reduce their amount to a minimum. One of the methods in use to reduce the undesirable effect of these heavy metal ions in hydrogen peroxide is addition of peroxide stabilizers which form complexes with these ions. Since the bulk of the metal ions often exists as anionic complexes with the added stabilizers, such hydrogen peroxide will contain significant amounts of heavy metal even after treatment with cation exchange resins. This heavy metal content and the carboxylic acid products of oxidation of organic impurities synergistically promote hydrogen peroxide decomposition. The joint catalysis greatly exceeds the sum of the effects of the heavy metal and carboxylic acid. The synergism is shown by the following results of tests with electrolytic hydrogen peroxide diluted to 30% w.

| Contaminant added: | Decomposition of $H_2O_2$ Percent/hr. at 80° C. |
|---|---|
| 0.2 N HCOOH | 0.75 |
| 0.2 mg./l. Fe | 1.8 |
| 0.2 N HCOOH+0.2 mg./l. Fe | 10.4 |

The magnitude of this synergism can be reduced somewhat by pH control but the undesirable peroxide decomposition cannot be avoided completely by attempted removal of the carboxylic acid because the synergism continues during continued generation of carboxylic acid by oxidation of the organic impurities present. As a result hydrogen peroxide losses in the prior methods of purification have been greater than is desirable in plant scale operations.

We have found that losses of hydrogen peroxide by synergistic catalysis of its decomposition by heavy metals and carboxylic acids during removal of relatively non-volatile organic impurities by thermal degradation to carboxylic acids which can be subsequently separated from the peroxide, can be minimized by subjecting the impure hydrogen peroxide to treatment to remove both metal cations and heavy metals complexed as anions before carrying out the thermal degradation to carboxylic acids. The process of the invention thus has an essential feature the combination of treatment of hydrogen peroxide containing organic impurity, especially relatively non-volatile organic impurities, with anion and cation exchange resins to remove therefrom heavy metal and then heating the hydrogen peroxide before exposing it to re-contamination with heavy metal, the heating being controlled so as to convert relatively non-volatile organic impurity to carboxylic acids. The acid thus formed is then separated from the hydrogen peroxide.

The treatment with anion and cation exchange resins to remove both the heavy metal cations and complexed heavy metal in anionic form can be carried out in a number of different ways. One advantageous method is to pass the impure hydrogen peroxides through a single bed of mixed anion and cation exchange resins or through successive beds of the two different kinds of resins. The flow may be through separate columns of anion exchange resin and cation exchange resin bed in either order. However, there has been found, unexpectedly, to be a substantial increase in overall resin life by placing the anion exchange bed first in the sequence since attack of hydrogen peroxide on the cation exchange resin is thus reduced.

A large number of suitable anion and cation exchange resins are available. As a class these resins are high molecular weight polyacids or polybases which are virtually insoluble in, and inert to, the hydrogen peroxide solution being purified. They preferably consist of a three-dimensional hydrocarbon network to which are attached the acid or basic groups which act as the ion exchangers.

The cation exchangers can contain sulfonic, phosphonic, phosphonous, arsenic and like acid groups. Strongly acidic cation exchangers such as sulfonated cross-linked polystyrene are especially advantageous. Examples of these cation exchangers are Amberlite IR-120 produced by Rohm and Haas Company, Chempro C-20 and Duolite C-25 of Chemical Process Company, Dowex 50 of Dow Chemical Company, Nalcite HCR of National Aluminate Corporation and Permutit Q of Permutit Company. Sulfonated phenol-aldehyde condensation products are another form of suitable cation exchange resin which can be used in the new process. The sulfonic acid group in these resins can be on a chain, as in a $$-CH_2SO_3H$$

group, or can be attached directly to the aromatic nucleus. The first named type is made, for example, by heating together phenol, formaldehyde, and a mixture of sodium sulfite and metabisulfite, then adding more phenol and formaldehyde and heating to gelation, or is made by introducing the sulfonic groups into a preformed phenol-formaldehyde condensate. The second type can be prepared by reacting a paraphenol sulfonic acid with formaldehyde and phenol and heating the resin in drying pans to remove the excess water and form a cross-linkage. This resin has both —$SO_3H$ and —OH groups attached to an aromatic ring, the —$SO_3H$ groups being effective in ion exchange. U.S. Patent 2,676,923 describes nuclear sulfonated aromatic hydrocarbon cation exchange resins which are especially preferred in the new process. The patent also shows suitable methods for contacting the resin with the $H_2O_2$ solution to be purified and for regenerating the resin after use.

While the cation exchange resin can be used in the hydrogen form in the conventional way, there are special advantages in using these resins in the form of salts because the resin is more resistant to attack by the peroxide when in salt form. The cations used in making the resin salts should be such as are not detrimental in the peroxide. Suitable resin salts are, for example, the alkali, ammo-nium and alkaline earth metal salts. Sodium salts are especially suitable because of their economy and effectiveness.

The preferred anion exchange resins are strong base resins. Especially suitable anion exchange resins of this kind are, for instance, the quaternary ammonium salt type resins, such, for example, as the products of amination with trimethyl amine or dimethyl ethanol amine of chloromethylated polymers, e.g., chloromethylated styrene-divinyl benzene copolymers. Representative commercially available exchangers of these types are Amberlite IRA-400, IRA-401 and IRA-410 of Rohm and Haas Company, Dowex 1 and Dowex 2 of Dow Chemical Company, Nalcite SBR and SAR of National Aluminate Corp., Permutit S-2 of Permutit Co., and Duolite A-42 and A-40 of Chemical Process Co. U.S. Patents 2,388,-235 and 2,591,573 describe processes for producing anion exchange resins which can be used in the invention.

Dowex 2 or Nalcite SAR is a quaternary ammonium salt of the general formula $RR'R''R'''N^+.A^-$, in which one of the R's is derived from polystyrene, which in turn has been crosslinked with divinylbenzene. Two R-groups are methyl groups and one R-group is the hydroxy-ethyl group. The resultant anion exchange resin is a highly dissociated organic salt, in which the large cationic body is limited in movement and the relatively small and mobile anion is free to exchange in a wide pH-range.

Dowex 1 or Nalcite SBR is a quaternary ammonium salt of the general formula $R.R'R''R'''N^+.A^-$, in which one of the R's is derived from polystyrene which has been crosslinked with divinylbenzene, and the other three R's are methyl.

The chosen anion exchange resin should be used in a salt form to avoid high pH. In this way the undesirable decomposition of peroxide which takes place at high pH, especially in the presence of heavy metal ions, is avoided. Another advantage of using the anion exchange resin in salt form is the greater resistance to attack by hydrogen peroxide which the resins have when used as salts as compared with the resin in hydroxide form. A variety of different kinds of anions can be used in making anion exchange resin salts useful in the process of the invention.

A special feature of the invention is the use of anion exchange resins in the form of their salts of strong acids for the removal of metal ions complexed as anions from mixtures of these ions with carboxylic acids. It has been discovered that the complexed metal anions can be selectively removed in this way without substantial removal of carboxylic acid. This unexpected improvement has other advantageous applications than in the present process but is especially useful in this new method of hydrogen peroxide purification. By employing as the anion of the exchange resin salt, an anion of an acid which is stronger than the carboxylic acid in the hydrogen peroxide, catalytic metal ions can be removed from the peroxide without removing carboxylic acid at the same time. The capacity of the resin for metal removal is thus increased compared with operation so as to simultaneously remove carboxylic acid which would require regeneration upon breakthrough of carboxylic acid. Indeed by using anion exchange resin salts which do not remove carboxylic acid from the peroxide, the capacity of the resin for metal anion removal is so great that as a general rule it is economically feasible to discard it when it has reached saturation rather than to regenerate it for reuse in the process although regeneration can be carried out simply as described hereinafter.

By the use of anion exchange resin salts of strong acids the desired low pH is maintained in the hydrogen peroxide during complexed metal anion removal without need for exacting control. This makes the operation simpler and more convenient than when resort is had to the bicarbonate salt form of the resin which can also be used to avoid high pH but requires vigilance and care in applying the necessary carbon dioxide pressure to insure that localised regions of high pH do not develop. These not only result in undesirable loss of hydrogen peroxide which may lead to a rather rapid pressure rise but also cause degradation of the resins. All these disadvantages are eliminated by use of strong acid salts of the anion exchange resins.

A number of different anions of strong acids can be used in making the preferred anion exchange resin salts employed in removal of complexed metal anions prior to heat treatment according to the new process. Among the suitable anions of acids stronger than the monocarboxylic acid impurities, are, for instance, the nitrate, the sulfate, the hydrogen sulfate, the dihydrogen phosphate, the di- or tri-hydrogen pyrophosphate, the perchlorate, and the like. Fluorides, etc., are also effective but are less desirable because of the corrosion which they promote.

There are special advantages in using salts of strong base anion exchange resins which introduce into the peroxide solution as a result of the exchange with the metal anions, anions which are useful in inhibiting corrosion or in the stabilization of hydrogen peroxide. In this category are, for example, the nitrate salts which provide a corrosion inhibitor for the peroxide and the phosphate, pyrophosphate and 1,2-diaminocyclohexane-N,N'-tetraacetic acid salts in their partly protonated forms, which introduce useful hydrogen peroxide stabilizers.

Still other forms of anion exchange resin salts can be used in the new process. Salts of the carboxylic acids in the hydrogen peroxide being treated are one suitable form of resin salt since they do not introduce into the peroxide any undesirable components not already present and at the same time avoid the undesirable high pH of the hydroxyl form of the resin. The acetate and formate salts are convenient salts of this type which can be used successfully.

Whatever the form of anion and cation exchange resins chosen, it is desirable that they be kept below about 80° C. and more advantageously below 40° C. during the contacting since the life of the ion exchange resins decrease as the contacting temperature increases. The preferred temperature is between the freezing point of the solution being treated and about 30° C., most preferably between about 10° and about 25° C.

The time of contact of the hydrogen peroxide solution with the ion exchange resins can vary widely. Excessively long times of contact which lead to undesirably short resin life per volume of hydrogen peroxide treated due to attack on the resin by the peroxide are of course to be avoided especially since relatively short times of contact are sufficient in order to secure adequate removal of heavy metal impurities. Thus times of the order of about 1 sec. to about 1 hour are suitable and more preferably times of about 10 sec. to about 10 minutes are used.

The removal of heavy metals from the hydrogen peroxide can be effected essentially quantitatively in this way. A high degree of utilization of resin capacity can be realized before breakthrough of heavy metals in either cationic form or as anionic complexes. The resin capacity is usually so high in the new process that it is economically feasible to dispose of the exhausted resin without regenerating it for reuse in the process. However, upon or just before breakthrough of heavy metals, the resins can be regenerated and used again in the process through many cycles.

If desired, regeneration of the cation exchange resin after it has reached the predetermined degree of saturation decided upon can be effected, for example, by treatment with a strong acid or salt such, for instance, as sulfuric, phosphoric, or nitric acid or sodium nitrate. Acid or salt concentrations of the order of about 2 to 20% by weight, for example, are useful. A convenient way of carrying out the regeneration is to pass the regenerant through a fixed bed of the resin until the effluent shows a negative test for iron by the potassium thiocyanate method. Preferably, the regenerated resin is washed with water to free it of excess regenerant before being used. Thus, in the preferred method, the resin which has been conditioned with sodium sulfate is washed with water until the washings are substantially free of sulfate ion so that the purified peroxide will not be unduly contaminated with sulfate. The regenerated resins can then be reused in the process.

When the anion exchange resin used for removal of complexed heavy metal from the hydrogen peroxide before heat treatment to convert organic impurities to a more readily removable form is to be regenerated instead of replaced with fresh resin, the regeneration can be effected in a number of different ways. Treatment with an appropriate acid or with a suitable salt are suitable methods of regeneration, for example. By these methods of treatment the complexed heavy metal anions can be replaced and the salt form of the anion exchange resin can be simultaneously regenerated for reuse in the process. As in the regeneration of the cation exchange resin, it is desirable to remove excess regenerating solution from the anion exchange resin by water washing before returning the regenerated resin to the operating cycle in order that unnecessary contamination of the hydrogen peroxide under treatment may be avoided.

A mixed bed of anion and cation exchange resins can be regenerated in situ without separating the two resins, by passing the desired acid over both resins, e.g., $HNO_3$ regenerates the cation resin in $H^+$ form and the anion resin in $NO_3^-$ form directly. By the use of a salt for regeneration of the mixed bed, e.g., $NaNO_3$, the cation exchange resin can be obtained in a desirable salt form while the acid salt of the anion exchange resin is simultaneously regenerated.

After treatment of the hydrogen peroxide with anion and cation exchange resin, the peroxide essentially free from heavy metal is subjected to controlled heat treatment to convert the organic impurity present therein to a more readily removable form. This heat treatment essentially consists of thermal degradation of organic impurity in hydrogen peroxide at elevated temperature without added catalyst. In this heating the organic impurity is converted to carboxylic acids, usually predominantly formic and acetic acids. Because of the previous deionization of the peroxide, the degradation of organic impurities can be carried out successfully at high temperatures at which rapid rates of oxidation of the organic impurity to these more readily removable acids takes place with minimized peroxide loss.

It has been found that within the temperature range of about 60° to about 200° C. the rate of degradation of organic impurities in hydrogen peroxide increases much more rapidly with temperature when the peroxide has been deionized than is the case with non-deionized peroxide. The rate of hydrogen peroxide decomposition, on the other hand, increases much more rapidly with temperature for crude non-deionized hydrogen peroxide than for the same peroxide deionized. The comparative activation energies for these different reactions are approximately as follows:

| | Organic Impurity Decomposition, $E_1$ (kcal. per mole) | Hydrogen Peroxide Decomposition, $E_2$ (kcal. per mole) | $E_1-E_2$ |
| --- | --- | --- | --- |
| Non-deionized Hydrogen Peroxide | 14 | 26 | −12 |
| Deionized Hydrogen Peroxide | 21 | 16 | +5 |

The surprising change in sign of the activation energy difference upon which the selectivity of the thermal degradation of the organic impurities depends explains the success of high temperature treatment in the present process as contrasted with earlier results with hydrogen peroxide which had not been treated with both anion and cation exchange resins to remove both anionic and cationic forms of heavy metal before heating.

Temperatures of thermal degradation of about 110 to about 250° C. are suitable in the new process although as a general rule temperatures in the range of from about 150° C. to about 200° C. are adequate for commercially attractive rates of degradation of organic impurities without excessive hydrogen peroxide loss. At any given temperature the degree of degradation of organic impurity will increase with the heating time but longer heating times also increase the loss of hydrogen peroxide through undesirable reactions. It is therefore preferred to use heating times between about 30 sec. and about one hour. Most advantageously times of about 1 to about 20 minutes are used when carrying out the treatment at the preferred temperatures of about 150° to 170° C. Best results are obtained by using the longer times at the lower temperatures and vice versa and maintaining the mixture substantially in the liquid state throughout the heat treatment.

As previously pointed out, hydrogen peroxide is corrosive, especially at elevated temperatures. On this account it is desirable to carry out the heat treatment in a corrosion resistant vessel. While glass or porcelain surfaces are desirable because of their high resistance to corrosion it is usually more advantageous in large commercial scale operations to use corrosion resistant metal vessels and/or heating tubes for the treatment. Tin, stainless steel, tantalum and zirconium surfaces are suitable when carefully cleaned and passivated in the way usual for apparatus in which hydrogen peroxide is to be used. Even with these surfaces some small amounts of catalytic metal ions may enter the peroxide under treatment through corrosion of the thermal reactor surfaces. Because of this and as a safeguard against any catalytic metal ions that may inadvertently survive the ion exchange pretreatment, it is usually advisable to add an inhibitor of hydrogen peroxide decomposition. Sodium stannate ($Na_2SnO_3 \cdot 3H_2O$) and sodium pyrophosphate ($Na_4P_2O_7 \cdot 10H_2O$) are typical of the hydrogen peroxide stabilizers which can be used to reduce $H_2O_2$ loss in the thermal treatment step of the new process. The amount of inhibitor should be kept to the minimum consistent with adequate hydrogen peroxide stability when ion exchange is to be used for the following step of the new process, namely, removal of the carboxylic acid which is formed in the thermal treatment. Quite small amounts of sodium stannate, for example about 2 to 50 mg. of $Na_2SnO_3 \cdot 3H_2O$ per liter of peroxide solution, have been found to be sufficient. For instance, in heat treating in contact with stainless steel at 150° C., addition of 50 mg. per liter of $Na_2SnO_3 \cdot 3H_2O$ reduced the peroxide loss from about 5.5% to about 2.2% during degradation of 50% of the organic impurity.

On completion of the heat treatment, the carboxylic acid produced therein by the degradation of organic impurities is removed to obtain the desired purified hydrogen peroxide. The removal of the carboxylic acids is relatively easy by either distillation or ion exchange. Among the suitable distillation methods are, for example, simple vacuum distillation, steam stripping, and extractive distillation with an inert solvent for hydrogen peroxide.

There are special advantages in using ion exchange resin for removal of the carboxylic acid formed in the preceding thermal degradation step of the new process since loss of hydrogen peroxide can be reduced by this method of operation. Any of the anion exchange resins described as useful in the preliminary treatment step of the process can be employed in this final acid removal operation. As previously pointed out there are advantages in using strong base anion exchange resins of the quaternary ammonium base or tertiary sulfonium types, especially when these strong base resins are used in the form of their salts so as to avoid exposure of the peroxide to high pH at which hydrogen peroxide decomposes rapidly. The conditions and methods of application of the anion exchange resin and its regeneration after use can be varied. It will usually be desirable to operate the anion exchange resin column differently in this case from that used to remove complexed metal anions prior to the heat treatment step where carboxylic acid removal was not necessary. For removal of carboxylic acids with anion exchange resin catalyst one can advantageously use the method of the copending application of Dunlop, Meeker and Pierotti previously referred to since there will be no substantial amount of heavy metals present so carbon dioxide pressure will insure sufficient pH control through bicarbonate salt formation to prevent dangerous hot spot formation. Alternatively, one can use a monohydrogen phosphate salt of a strong base anion exchange resin as described in the previously-mentioned copending application of Luten and Meeker to effect removal of the carboxylic acid without displacing the phosphate ion from the resin but forming instead a mixed phosphate-carboxylic acid salt of the resin.

Prior to the anion exchange resin treatment for removal of the carboxylic acids formed in the heat treatment step it will be advantageous to employ another anion exchange resin treatment of the type previously described for removal of heavy metal ions if there has been substantial pickup of these ions in the heat treatment step. This will minimize peroxide decomposition due to hot spot and improve the life of the resin used for carboxylic acid removal.

The new process can be applied successfully to the purification of hydrogen peroxide containing organic impurities regardless of the source of the peroxide or impurities therein. However, peroxide which contains readily separable volatile organic impurities together with more difficultly separable organic impurities will usually be most economically purified by removing the volatile impurities which can be separated without danger of excessive peroxide loss prior to treatment by the present method for removal of remaining less easily removed organic impurity. This is the preferred method of operation, for example, when purifying hydrogen peroxide produced by partial oxidation of an organic compound and containing both volatile and less volatile organic impurities. Because of the technical importance of this application of the new process illustrations are given in the attached drawing of suitable methods of combining the new process with other purification steps to obtain high purity hydrogen peroxide from such sources. The drawing is a flow sheet showing diagrammatically an assemblage of apparatus, not drawn to scale, suitable for carrying out certain of these modifications of the invention but omitting, in the interest of simplicity and clarity, auxiliary equipment such as pumps, condensers, vacuum sources, etc., as well as valves, meters, gauges and the like since their location in the system will be obvious to those skilled in the art.

In the drawing, line 1 represents a supply line for the crude hydrogen peroxide to be purified. In the case of crude hydrogen peroxide produced by oxidation of a secondary alcohol, for example, isopropyl alcohol, this will be a stream of aqueous hydrogen peroxide containing approximately an equivalent amount of acetone, and unreacted isopropyl alcohol together with organic impurities some of which distill readily with the acetone and isopropyl alcohol while a significant amount typically of the order of about 1 to about 2 parts per 100 parts of hydrogen peroxide will be higher boiling more difficultly removable organic impurities. Line 1 feeds to column 2 in which the acetone and isopropyl alcohol content of the mixture is distilled off together with water carried overhead as the alcohol-water azeotrope. Organic impurities boiling in the same range will also be taken off by line 3. The column can be a conventional bubble-plate or gridtray column or the like which can be operated at ordinary or reduced pressures or at a superatmospheric pressure which is preferably not greater than about 25 p.s.i.g. Since the object of the distillation in column 2 is simple removal of components more volatile than hydrogen peroxide, the temperatures and reflux ratios will be adjusted to that end and chemical changes will be minimized.

The bottom product from column 2 is conducted by lines 4 and 4a to a flashing column 5 operated at reduced pressure to take off hydrogen peroxide overhead by line 6 from higher boiling organic impurities taken off with a part of the hydrogen peroxide by bottom draw off line 7. Any conventional flashing still constructed of material inert to hydrogen peroxide decomposition can be used for this operation. The hydrogen peroxide is preferably flashed off rapidly without reflux, a pressure of the order of about 50 to about 500 mm. mercury being suitable. In order to avoid explosive mixtures in the reboiler or elsewhere in the flasher the bottoms product taken off by line 7 should not be too concentrated since its increased content of organic impurity makes it more hazardous at high peroxide concentrations. To further reduce the explosion hazard—here, particularly with regard to peroxide-resin mixtures—as well as to reduce attack upon the ion exchange resins to be contacted therewith, the bottom stream in line 7 is preferably diluted by water introduced by line 8 to bring the hydrogen peroxide concentration to below about 40% wt. A typical sample of such diluted flasher bottoms had the following gross analysis:

Hydrogen peroxide, percent wt _____ 35.5
Total carbon, percent wt _____ 1.1
Non-volatile carbon, meq. per ml.[1] _____ 0.44
Organic acid, meq. per ml _____ 0.10

[1] Not removed overhead by distillation, milliequivalent of carboxylic acid generated per milliliter of peroxide solution by analytical oxidation in alkaline solution at 60° C.

It is sometimes desirable to take off by line 9 a bleed stream of this peroxide in order to avoid excessive buildup of salts and the like in the system.

The diluted flasher bottoms are fed to anion exchange column 10 which may advantageously be charged with a quaternary ammonium base resin in salt form. Good results have been obtained, for instance, with Dowex 1X8, 20-50 mesh, in nitrate form. Preferably the peroxide solution is cooled, by means not shown, to a temperature of about 35° C. or lower before being contacted with the resin since attack on the resin is reduced at low temperatures. Downflow, flooded bed operation is illustrated in the drawing as channeling can be minimized by this method but upflow or trickle downward flow can be used instead. Only one anion exchange column is shown in the drawing, but in commercial practice it is usually desirable to employ at least two such columns in order that one can be regenerated or recharged with fresh resin while the other is in its operating cycle so there need be no interruption of the flow of hydrogen peroxide through the system. The columns will be provided with feed lines and drawoff connections, not shown, for use in regeneration and washing the resin in the conventional way. Tests of the column effluent for anionic heavy metal complex can be made periodically and the flow switched to the regenerated column as soon as breakthrough of such complex reaches a predetermined value. Carboxylic acid will not be removed in this column which will selectively remove anionic heavy metal complexes from the peroxide. The effluent from anion exchange column 10 is passed by line 11 to cation exchange column 12 which is preferably charged with a strong acid exchange resin such as Dowex 50X8, 20-50 mesh, resin in hydrogen or sodium form. This column can be operated by the downflow, flooded bed system or any other conventional technique. The effluent will be essentially free of heavy metal as shown by the following results obtained in deionizing a typical sample of flasher bottoms diluted to 39% $H_2O_2$:

| | Feed to Deionization Columns | Deionized Product |
|---|---|---|
| Iron—mg. per liter | 1.7 | less than 0.01. |
| Copper—mg. per liter | 0.03 | less than 0.01. |
| Chromium—mg. per liter | 0.66 | less than 0.01. |

The bulk of the metal ions were removed on the anion exchange resin and without the use of this resin in combination with a cation exchange the hydrogen peroxide cannot be sufficiently freed of catalytic metal ions to eliminate the synergistic peroxide decomposition during the subsequent thermal treatment according to the invention. The difference in rate of hydrogen peroxide decomposition achieved by this deionization is shown by the results of tests with the same hydrogen peroxide used for the foregoing metal analyses. Heating at 100° C. caused decomposition at the rate of 10.3% per hour in the crude flasher bottoms diluted to 39% $H_2O_2$ while after deionization the loss of hydrogen peroxide at 100° C. was only 0.25% per hour. The addition of fresh inhibitors to the deionized peroxide reduced the rate of decomposition still further. The heat treatment step of the process is carried out in heater 14 to which the hydrogen peroxide is fed directly by line 13 from cation exchange unit 12. Heater 14 may take any form suitable for heating the peroxide in liquid phase and maintaining it at the required temperature for sufficient time to effect the desired degradation of organic impurity. One design which has been found satisfactory for this treatment comprises a preheater, advantageously heated by high pressure steam, e.g., of about 250 p.s.i.g. Directly connected to the preheater is a pipeline reactor constructed of several passes of pipe to provide a residence time of about ½ to 30 minutes when using a temperature of about 200° to about 130° C. for instance. The effluent is cooled by means not shown and any gas present is preferably separated in a deentrainment unit, also not shown, after which the treated hydrogen peroxide is passed by line 15 to lines 4 and 4a feeding to flashing unit 5. In flasher 5 the volatile carboxylic acid formed in the heat treatment in unit 14 will be taken off overhead by line 6 along with hydrogen peroxide and water coming in part from column 2 and in part from heater 14.

The overhead product from flasher 5 taken off by line 6 is treated to separate the volatile organic impurities, chiefly carboxylic acid, from the hydrogen peroxide. This can be accomplished in a number of different ways. Anion exchange resin treatment is one suitable method but as previously pointed out should be carried out differently from the anion exchange used in column 10 where the purpose was removal of catalytic metal ions present in anionic form as a result of complex formation with the peroxide stabilizer present and where carboxylic acid removal was not necessary. For anion exchange resin treatment of flasher 5 overhead one can advantageously use one of the previously mentioned methods employing salts of strong base exchange resins. Steam stripping is an alternative which is advantageous and is shown as carried out in column 16 with steam admitted by line 17. Carboxylic acid together with small amounts of other volatile organic impurities are taken off via line 18 while purified hydrogen peroxide is recovered by line 19 and line 20 containing valve 21. The degree of purification of this hydrogen peroxide product will depend upon the time of treatment used in heater 14. The loss of peroxide in the process increases with the conversion of organic impurity. Above about 70 to 80% conversion the rate of degradation of organic impurity falls off and the loss of hydrogen peroxide per pound of organic impurity converted increases so it is generally more advantageous not to carry the conversion beyond these limits. By such operation the new method can be carried out to produce hydrogen peroxide having a carbon content of less than 100 parts per million, usually between about 20 and about 50 parts per million, with the loss of not more than 4%, and usually about 1 to 2.5%, of the hydrogen peroxide.

Typical results obtainable by this method of operation in which the feed to the system was the crude hydrogen peroxide product of oxidation of isopropanol, are shown in the following table for various temperatures and times of heat treatment of the flasher bottoms which were deionized with Dowex 1X8, nitrate form, and Dowex 50X8, hydrogen form, ion exchange resins from Dow Chemical Co., and inhibited with 125 mg. per liter of sodium pyrophosphate. The feed to the heater in each case had a $H_2O_2$ concentration of 31.84% and contained 0.381 meq. per milliliter of non-volatile organic impurity and 0.088 meq. per milliliter of acids:

| Heating Temperature (° C.) | Time of Heating (min.) | Non-Volatile Organic Impurity Degraded (mole percent) | Loss of $H_2O_2$ (percent of total) |
|---|---|---|---|
| 132 | 10 | 28.7 | 1.8 |
|  | 30 | 41.4 | 4.5 |
|  | 53 | 52.7 | 4.9 |
| 150 | 6.5 | 44.6 | 1.7 |
|  | 10 | 48.6 | 2.9 |
|  | 15 | 55.2 | 5.5 |
|  | 23 | 62.0 | 6.6 |
|  | 32 | 69.3 | 7.6 |
| 167 | 6 | 73.2 | 9.4 |

An alternative method of operation which also gives successful results is to carry out the heat treatment on the bottoms from column 16. In this modification line 19 is connected by pipe line 22 to anion exchange column 10 and valves 21 in line 20 and 23 in line 7 are closed. In exchange units 10 and 12 the hydrogen peroxide is deionized by treatment as previously described and then passed to heat treatment unit 14 in which the temperature and time of heating can be as in the method of operation described previously. The effluent from heater 14 is conducted to another anion exchange unit 24 by lines 15 and 25, valve 26 being closed and valve 27 open. Anion exchange column 24 is advantageously charged with a strong base exchange resin in salt form. Especially good results have been obtained with quaternary ammonium exchange resin in bicarbonate salt form for removal of carboxylic acid from hydrogen peroxide. This is especially the case when the peroxide is fed to the bed with a concurrent stream of carbon dioxide supplied by line 28 so as to maintain a true (i.e., corrected for the effect of hydrogen peroxide on a glass electrode as per Kolczynski et al. in J. Am. Chem. Soc. 79, 531 (1957)), pH of below about 6.5 in the solution and thus avoiding decomposition of the hydrogen peroxide by the strong base resin. In this modification of the invention it is advantageous to pass the peroxide in line 27 through an anion exchange resin column operated like column 10 to remove any heavy metal ions which may have been taken up by the peroxide in heating unit 14 before feeding the peroxide to column 24 for removal of carboxylic acids. The purified $H_2O_2$ is recovered by line 29 and will be free of contamination by anions introduced from the resin since the bicarbonate ions will form carbon dioxide which will go off as gas when the pressure is released. Typical results obtained in treating column 16 bottoms which contained 0.011 meq. per milliliter of non-volatile organic impurity and 28.68% wt. hydrogen peroxide stabilized with 250 mg. per liter of sodium pyrophosphate and 20 mg. per liter of sodium stannate trihydrate at 150° C. for three different periods were as follows:

| Time of Heating (minutes) | Non-Volatile Organic Impurity Degraded (mole percent) | Loss of $H_2O_2$ (percent of total) |
|---|---|---|
| 7 | 53 | 0.8 |
| 12 | 48 | 1.2 |
| 18 | 67 | 1.5 |

In still another modification of the process shown in the drawing, valves 30 and 31 are closed and valve 32 in line 33 is opened so the bottom product of distillation column 2 passes directly to line 7 feeding into anion exchange unit 10. The bottom product is then treated with anion and cation exchange resin and subjected to heating for degradation of organic impurity as previously described. After heat treatment the product can be passed to anion exchange resin column 24 for removal of the carboxylic acid formed in the heat treatment. It will then usually be desirable to connect line 29 to column 5 or column 16 in order that other impurities in the peroxides may be removed by distillation or valve 26 can be opened and valve 27 closed and the peroxide conducted via line 4 to distillation column 5 which may be operated as previously described with removal of bottoms by lines 7 and 9 the purified product being recovered via line 20 or column 5 can be controlled so as to take off acids overhead substantially free of peroxide, purified $H_2O_2$ then being recovered via lines 7 and 9.

The process of the invention can be applied in still other ways. One such procedure which is useful whether the deionization and heat treatment is carried out with the bottoms of column 2, column 5 or column 16 comprises anion exchange resin treatment of the heat treated peroxide after flashing in column 5 and/or steam stripping. For example, column 2 bottoms can be treated by passing them via lines 4, 33 and 7 to column 10 from which the peroxide passes to units 12 and 14. The heat treated peroxide is then fed via lines 4 and 4a to flasher 5, valve 26 being open and valves 27 and 31 being closed. The hydrogen peroxide, containing volatile carboxylic acid impurities, which is taken overhead in column 5 can then be passed by lines omitted from the drawing for the sake of simplicity, connecting line 6 with anion exchange unit 24 instead of stripping column 16. Alternatively the overhead product from column 5 can be steam stripped of volatile impurities in column 16 before being passed to anion exchange unit 24 for removal of any remaining acid impurities. In these and other methods of operation according to the invention, it is essential that the hydrogen peroxide be treated with both an anion exchange resin and a cation exchange resin before being subjected to the heat treatment to effect degradation of organic impurities. Cation exchange treatment is not sufficient since it does not remove the heavy metal in anionic form and the synergistic catalysis of hydrogen peroxide decomposition by such metal and carboxylic acid is not avoided.

The importance of removal of metal catalysts of hydrogen peroxide decomposition prior to heat treatment according to the invention is shown by the following results of tests made with hydrogen peroxide produced by oxidizing isopropyl alcohol in the liquid phase. The hydrogen peroxide solutions had been distilled to remove acetone formed in the process together with volatile impurities and isopropyl alcohol-water azeotrope and then flash distilled to remove aqueous hydrogen peroxide with further impurities and obtain bottoms products of impure hydrogen peroxide which were diluted to about 35% wt. concentration and which contained about 0.4 meq. per milliliter of non-volatile organic impurity and about 0.1 meq. per milliliter of organic acids. Tests were made with the diluted flasher bottoms without further treatment and also after deionization by passage through columns of Dowex 1 and Dowex 50 exchange resins in nitrate and hydrogen forms, respectively. The rates of degradation of the non-volatile organic impurity and rates of decomposition of hydrogen peroxide were measured at different temperatures. It was found that although the time required for 50% reduction in the amount of non-volatile organic impurity was increased by the deionization, the degradation of the organic impurity is made very much more selective at increased temperatures at which very short times of heat treatment are effective.

*Thermal Degradation of Flasher Bottoms*

| Temperature | Non-Volatile Hydrocarbon Degradation Rate ($k$) hr.$^{-1}$ | $H_2O_2$ Decomposition rate (percent/hr.) | Time Required for 50% Degradation Organic Impurity (hrs.) | Selectivity, Percent $H_2O_2$ Loss [1] |
|---|---|---|---|---|
| 100° C.: | | | | |
| Non-Deion | 0.80 | 9.4 | 0.866 | 8.14 |
| Deion | 0.063 | 0.26 | 11.0 | 2.86 |
| 160° C.: | | | | |
| Non-Deion | 8.90 | 1,400 | 0.0778 | 109 |
| Deion | 3.00 | 4.8 | 0.231 | 1.11 |

[1] For 50% degradation of organic impurity.

As these results show, efficient removal of non-volatile organic impurity is practical with minimized peroxide loss using a short heat treatment.

Many other variations in the new process can be made without departing from the invention.

Another way in which the process of the invention can be applied in connection with a hydrogen peroxide purification system of the type illustrated in the drawing comprises anion and cation exchange resin treatment of the overhead product of column 5 instead of treating column bottoms. In this modification of the invention line 6 is connected by a pipe not shown with anion exchange column 10. After removal of anionic complexed heavy metal impurities in column 10, the peroxide is passed to cation exchange column 12 and heat treatment unit 14 both of which are operated as previously described. The effluent from unit 14 is then conducted directly to steam stripper 16. Volatile carboxylic acids formed in the heat treatment are removed by line 18 and the purified peroxide product is recovered via line 20. Alternatively anion exchange column 24 can be used as previously pointed out to remove the carboxylic acid impurities, the purified product being recovered by line 29. For especially thorough removal of impurities one can use steam stripping of the effluent of heater 14 in column 16 followed by anion exchange resin treatment in column 24. The invention will be seen to be not limited to the examples which have been given of some of its applications nor is the invention restricted by any theory which has been proposed in explanation of the improved results which are attained.

We claim as our invention:

1. A process for removing from hydrogen peroxide organic impurities which are convertible to formic and acetic acids on heating the peroxide, which hydrogen peroxide contains said impurities together with catalysts which catalyze the decomposition of hydrogen peroxide said catalysts being both from the group consisting of iron, copper and chromium cations and from the group consisting of iron-containing, copper-containing, and chromium-containing anionic radicals, which comprises
   (a) contacting said hydrogen peroxide with a quaternary ammonium anion exchange resin in salt form to effect removal of said catalytic anions
   (b) contacting the hydrogen peroxide with a cation exchange resin of the group consisting of sulfonic, phosphonic, phosphorous, and arsenic acid cation exchange resins to remove from the peroxide said cationic heavy metal catalyst
   (c) passing the thus purified hydrogen peroxide directly to a heater in which it is heated at about 110° to about 250° C. for about 30 seconds to about 60 minutes under sufficient superatmospheric pressure to maintain the mixture substantially in the liquid phase, said heating being carried out substantially in the absence of heavy metal catalysts for hydrogen peroxide decomposition and without substantial concentration of the peroxide,
   (d) and removing from the thus heated hydrogen peroxide, the carboxylic acids predominating in formic and acetic acids which are formed from the organic impurities during said heating.

2. A process in accordance with claim 1 wherein the heating is carried out for a time less than 30 minutes at which not more than 70% of the organic impurities boiling at a temperature above the boiling point of hydrogen peroxide are converted in the process.

3. A process in accordance with claim 1 wherein the organic acids formed in the heating step are removed by contacting the peroxide with an anion exchange resin of the group consisting of quaternary ammonium and tertiary sulfonium anion exchange resins in salt form.

4. A process in accordance with claim 3 wherein the anion exchange resin is a bicarbonate salt of a quaternary ammonium exchange resin.

5. In a process for purifying hydrogen peroxide which contains organic impurities which are more volatile than hydrogen peroxide, other organic impurities which are less volatile than hydrogen peroxide and which are convertible to formic and acetic acids on heating the peroxide, and catalysts for hydrogen peroxide decomposition chosen both from the group consisting of iron, copper, and chromium cations and from the group consisting of iron-containing, copper-containing, and chromium-containing anionic radicals, wherein said hydrogen peroxide is
   distilled to remove said more volatile impurities, and then stripped with steam to take off purified hydrogen peroxide from impure hydrogen peroxide containing said less volatile impurities,
the improvement which comprises
   (a) passing said impure hydrogen peroxide containing said less volatile impurities through a bed of quaternary ammonium anion exchange resin
       said resin being in the form of a salt of a strong acid which salt form of resin removes said catalytic anions without removal of carboxylic acids present in the impure peroxide
   (b) then passing the hydrogen peroxide through a bed of cation exchange resin of the group consisting of sulfonic, phosphonic, phosphorous, and arsenic acid cation exchange resins,
       said resin being in the form of a salt which salt form of resin removes said cationic heavy metal catalysts
   (c) passing the resulting purified peroxide directly to a heating zone in which it is maintained in the liquid phase at about 150° to about 170° C. for less than 30 minutes to effect conversion of organic impurities present therein to formic and acetic acids without substantial evaporation,
   (d) adding hydrogen peroxide stabilizer of the group consisting of sodium stannate and sodium pyrophosphate to the resin treated peroxide before said heating
   (e) cooling the heat treated peroxide and removing therefrom the volatile organic acid of the group consisting of formic acid and acetic acid which is formed in the heat treatment.

6. A process in accordance with claim 5 wherein the flasher bottoms are contacted successively with the anion and cation exchange resins, said cation exchange resin being in the sodium salt form, and then subjected to said heat treatment.

7. A process in accordance with claim 5 wherein the carboxylic acid formed in the heat treatment is removed by passing the hydrogen peroxide therefrom through an anion exchange resin of the group consisting of quaternary ammonium and tertiary sulfonium anion exchange resins in salt form.

References Cited in the file of this patent

UNITED STATES PATENTS

| | | |
|---|---|---|
| 2,772,237 | Bauman et al. | Nov. 27, 1956 |
| 2,819,949 | Keeler et al. | Jan. 14, 1958 |
| 2,830,874 | Long et al. | Apr. 15, 1958 |

FOREIGN PATENTS

| | | |
|---|---|---|
| 167,414 | Austria | Jan. 10, 1951 |
| 190,904 | Austria | July 25, 1957 |
| 198,234 | Austria | Dec. 15, 1957 |
| 826,015 | Great Britain | Dec. 23, 1959 |

OTHER REFERENCES

Wheaton et al.: "Ind. and Eng. Chem.," vol. 43, No. 5, May 1951, pages 1088–1093.